United States Patent
Toyofuku

(10) Patent No.: US 7,642,905 B2
(45) Date of Patent: Jan. 5, 2010

(54) ELECTRONIC DEVICE AND TYRE

(75) Inventor: Masanobu Toyofuku, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 305 days.

(21) Appl. No.: 11/886,316

(22) PCT Filed: Mar. 13, 2006

(86) PCT No.: PCT/JP2006/304884

§ 371 (c)(1),
(2), (4) Date: Sep. 14, 2007

(87) PCT Pub. No.: WO2006/098265

PCT Pub. Date: Sep. 21, 2006

(65) Prior Publication Data

US 2009/0009312 A1    Jan. 8, 2009

(30) Foreign Application Priority Data

Mar. 14, 2005    (JP) .............................. 2005-071460

(51) Int. Cl.
*B60C 23/00*    (2006.01)
(52) U.S. Cl. .................. 340/447; 340/442; 340/445; 73/146
(58) Field of Classification Search .................. 340/447, 340/442, 445, 443, 444; 73/146, 146.4, 146.5, 73/146.8
See application file for complete search history.

(56) References Cited

U.S. PATENT DOCUMENTS

| 4,048,614 | A | * | 9/1977 | Shumway .................. 340/447 |
| 5,977,870 | A | | 11/1999 | Rensel et al. |
| 6,101,870 | A | * | 8/2000 | Kato et al. ................. 73/146.8 |
| 6,340,929 | B1 | * | 1/2002 | Katou et al. ................ 340/447 |
| 6,568,259 | B2 | * | 5/2003 | Saheki et al. ................. 73/146 |
| 6,609,419 | B1 | | 8/2003 | Bankart et al. |
| 6,799,455 | B1 | * | 10/2004 | Neefeldt et al. .............. 73/146 |
| 2003/0066343 | A1 | | 4/2003 | Fischer et al. |
| 2003/0098788 | A1 | | 5/2003 | Tsujita |

FOREIGN PATENT DOCUMENTS

| JP | 10-44726 A | 2/1998 |
| JP | 11-78447 A | 3/1999 |
| JP | 11-173933 A | 7/1999 |
| JP | 11-180117 A | 7/1999 |
| JP | 11-240315 A | 9/1999 |
| JP | 2000-177340 A | 6/2000 |

(Continued)

*Primary Examiner*—Toan N Pham
(74) *Attorney, Agent, or Firm*—Sughrue Mion, PLLC

(57) ABSTRACT

An electronic device (40) includes a transmitter substrate (43) for generating information to be measured by a sensor (50) arranged in a partitioned space (10) which is partitioned by a tyre (1) and a rim wheel (2), a signal line (45) extended from the transmitter subs/rate (43)to outside of the partitioned space (10) and passing through an inner side of an air valve (30) provided at the rim wheel (2), the signal line (45) being formed by a core wire (45a) made of a conductor and a coaxial cable (45b) covering that core wire (45a), and an antenna (47) for transmitting radio waves containing the information (such as information of the tyre 1) generated by that transmitter substrate (43), the antenna (47) being connected to the signal line (45) and positioned outside the air valve (30).

6 Claims, 3 Drawing Sheets

FOREIGN PATENT DOCUMENTS

| | | |
|---|---|---|
| JP | 2000-177341 A | 6/2000 |
| JP | 2002-536235 A | 10/2002 |
| JP | 3392364 B2 | 1/2003 |
| JP | 2003-146033 A | 5/2003 |
| JP | 2003-159921 A | 6/2003 |
| JP | 2003-165313 A | 6/2003 |
| JP | 2004-148953 A | 5/2004 |
| JP | 2005-186658 A | 7/2005 |
| JP | 2006-131027 A | 5/2006 |
| WO | WO 02/20287 A1 | 3/2002 |
| WO | WO 03/097386 A1 | 11/2003 |

\* cited by examiner

PARTITIONED SPACE 10

PARTITIONED SPACE 10

ELECTRONIC DEVICE AND TYRE

TECHNICAL FIELD

The present invention relates to an electronic device capable of transmitting information by radio and also relates to a tyre.

BACKGROUND ART

Conventionally, electronic devices such as a sensor for measuring an air pressure (internal pressure) of the compressed air that fills up a tyre and a transmitter for transmitting radio waves containing information measured by that sensor to a wheel side have been arranged inside a tyre, or more specifically, in a space partitioned by a tyre and a rim wheel (a partitioned space, hereafter).

In FIG. 1 of Japanese Patent Application Laid Open No. 2004-148953, an electronic device 7 is arranged between an inner liner 6 positioned inside a belt layer in a radial direction of a tyre 1 and that belt layer.

In Japanese Patent Application Laid Open No. 2003-146033, an air valve 21 attached to a rim wheel 22 and an electronic device 10 are set in an integrated form such that a pressure or the like of the compressed air that fills up a tyre can be measured. When FIG. 1 is combined with FIG. 2 and FIG. 3, an antenna 14 is positioned inside the partitioned space.

As a result of arranging the electronic device in the partitioned space as described above, the radio waves transmitted by that electronic device will be attenuated by repeating reflections in that partitioned space. For this reason, there has been a problem that the radio waves emitted outside the tyre become weak compared with the radio waves transmitted by the electronic device.

More specifically, in a tyre, various metallic materials (wire cords and steel cords, for example) are used for portions (a bead portion and a carcass layer, for example) constituting that tyre, and in a rim wheel, iron, aluminum or the like is used, so that the radio waves transmitted by the electronic device will be attenuated by repeating reflections in the partitioned space.

Also, in FIG. 2 of Japanese Patent Application Laid Open No. H 11-240315, an antenna 16 is directly projected outside at a position close from an air control valve 10, rather than piercing the antenna 16 through the air control valve 10. In such a structure, an LC resonance (L: coil, C: capacitor) will be generated, so that there arises a need to adjust a circuit for matching the antenna 16 (such as a resistance capacitor and a coil).

In addition, in a tyre air pressure warning device of FIG. 1 of Japanese Patent No. 3392364, insulative grommets 19, 20 are disclosed. However, these insulative grommets 19, 20 are insufficient for high frequencies, so that the LC resonance cannot be prevented completely.

DISCLOSURE OF THE INVENTION

Hence, the present invention has been achieved in view of the above described problems, and has an object to provide an electronic device and a tyre which are capable of transmitting high precision radio waves which will not be reflected in the partitioned space.

An electronic device according to the first aspect of the present invention comprises a generation unit for generating information to be measured by a sensor arranged in a partitioned space which is partitioned by a tyre and a rim wheel, a signal line extended from the generation unit to outside of the partitioned space and passing through an inner side of an air valve provided at the rim wheel, the signal line being formed by a core wire made of a conductor and a coaxial cable covering the core wire, and an antenna for transmitting radio waves containing the information generated by the generation unit, the antenna being connected to the signal line and positioned outside the air valve.

An electronic device according to the second aspect of the present invention comprises a generation unit for generating information to be measured by a sensor arranged in a partitioned space which is partitioned by a tyre and a rim wheel, a signal line extended from the generation unit through the rim wheel to outside of the partitioned space, the signal line being formed by a core wire made of a conductor and a coaxial cable covering the core wire, and an antenna for transmitting radio waves containing the information generated by the generation unit, the antenna being connected to the core wire and positioned outside the partitioned space.

A tyre according to the third aspect of the present invention is a tyre on which at least an electronic device capable of transmitting information by radio is provided, in which the electronic device comprises a generation unit for generating information to be measured by a sensor arranged in a partitioned space which is partitioned by the tyre and a rim wheel, a signal line extended from the generation unit to outside of the partitioned space and passing through an inner side of an air valve provided at the rim wheel, the signal line being formed by a core wire made of a conductor and a coaxial cable covering the core wire, and an antenna for transmitting radio waves containing the information generated by the generation unit, the antenna being connected to the signal line and positioned outside the air valve.

A tyre according to the fourth aspect of the present invention is a tyre on which at least an electronic device capable of transmitting information by radio is provided, in which the electronic device comprises a generation unit for generating information to be measured by a sensor arranged in a partitioned space which is partitioned by the tyre and a rim wheel, a signal line extended from the generation unit through the rim wheel to outside of the partitioned space, the signal line being formed by a core wire made of a conductor and a coaxial cable covering the core wire, and an antenna for transmitting radio waves containing the information generated by the generation unit, the antenna being connected to the core wire and positioned outside the partitioned space.

BEST MODE FOR CARRYING OUT THE INVENTION

First Embodiment

Figure 1:
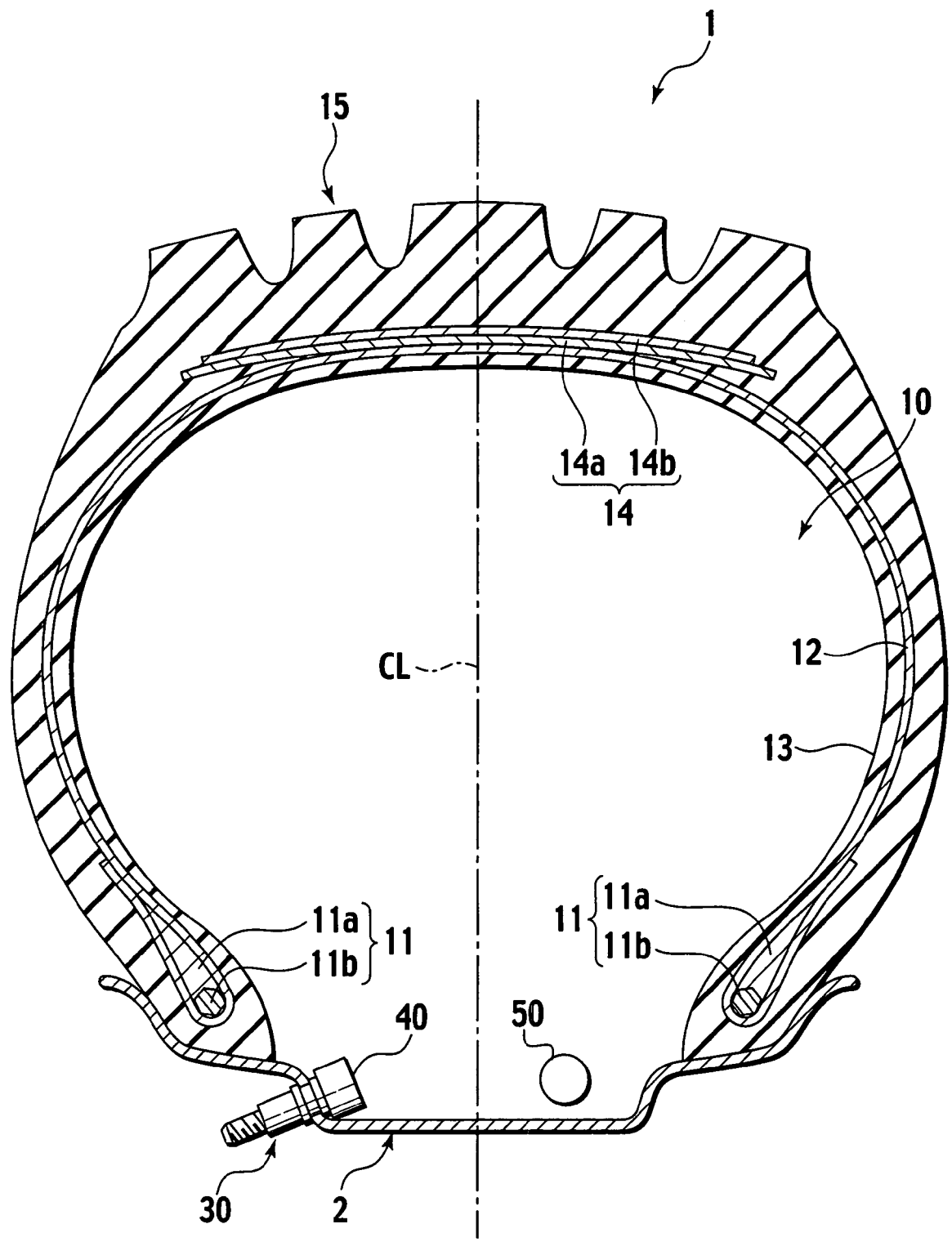
FIG. 1 is a cross sectional view in a tread width direction of a tyre filled with air and a rim wheel according to the first embodiment and second embodiment of the present invention.

In the following description of the drawings, identical or similar portions will be given identical or similar reference numerals. Note however that the drawings are only schematic, and it should be noted that a ratio of respective sizes and the like is different from a real one. Consequently, concrete sizes and the like should be judged by referring to the following explanation. Also, it goes without saying that, even among the drawings, portions in which a relationship or a ratio of mutual sizes is different are included.

FIG. 1 is a cross sectional view in a tread width direction of a tyre 1 and a rim wheel 2 according to the first embodiment. As shown in FIG. 1, the tyre 1 has a pair of bead portions 11 containing a bead core 11b and a bead filler 11a More specifically, for the bead core 11b that constitutes the bead portion 11, a steel cord or the like is used.

The tyre 1 has a carcass layer 12 which becomes a framework of that tyre 1. Also, on an inner side in a tyre radial direction of the carcass layer 12, an inner liner 13 which is a rubber layer with a high airtightness and serves as a tube is provided.

Also, on an outer side in a tyre radial direction of the carcass layer 12, a belt layer 14 is arranged. More specifically, the belt layer 14 comprises a first belt layer 14a positioned on an outer side in a tyre radial direction of the carcass layer 12, and a second belt layer 14b positioned on an outer side in a tyre radial direction of that first belt layer 14a.

In addition, on an outer side in a tyre radial direction of the belt layer 14, a tread portion 15 to contact a road surface is arranged.

The above described structural elements are substantially left and right symmetrical with respect to a center line CL of FIG. 1.

On the rim wheel 2, an air valve 30 for pouring air into a space partitioned by the tyre 1 and the rim wheel 2 (a partitioned space 10, hereafter) is provided. On the partitioned space 10 side of this air valve 30, an electronic device 40 is attached.

Figure 2:
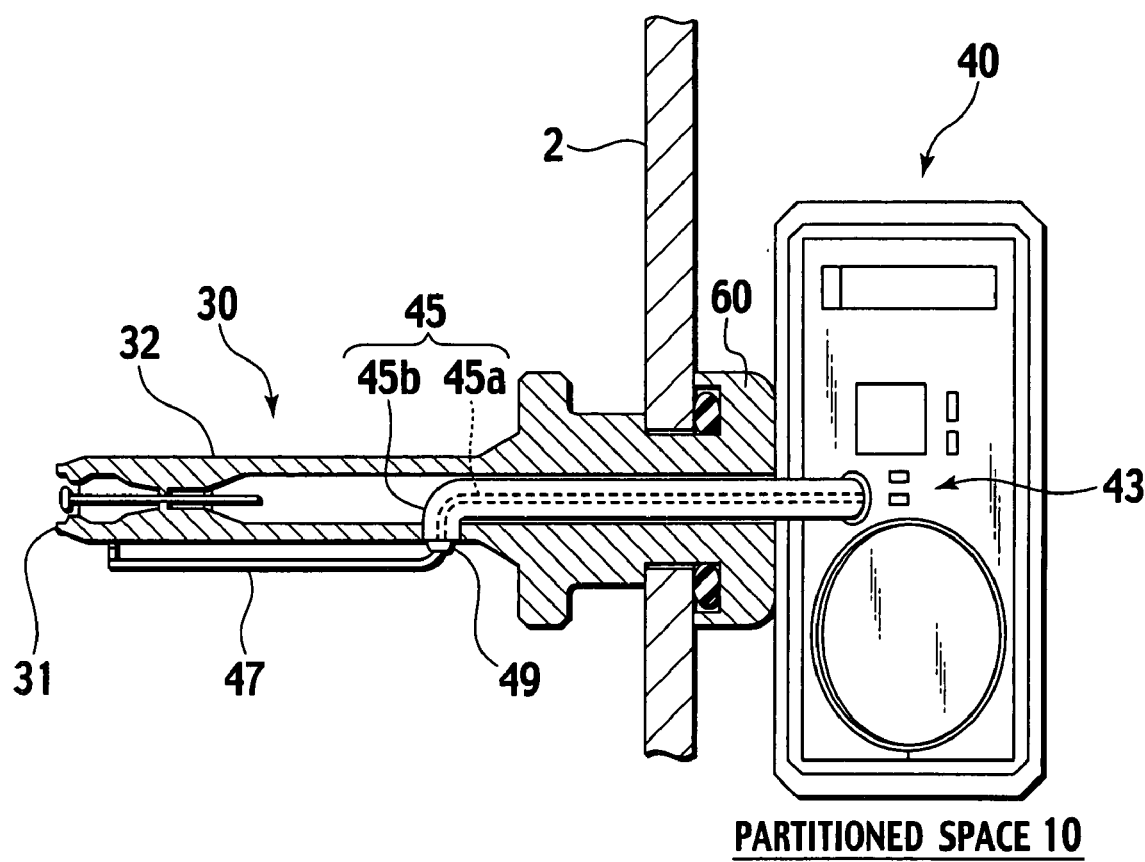
FIG. 2 is an enlarged cross sectional view of an electronic device according to the first embodiment of the present invention.

Here, as shown in FIG. 2, the electronic device 40 comprises a transmitter substrate 43 (generation unit) for generating information of the tyre (an inner pressure of the tyre, for example) to be measured by a sensor arranged in the partitioned space 10, a signal line 45 extended from that transmitter substrate 43 to outside of the partitioned space 10 (namely, outside of the tyre 1) and passing through inside the air valve 30, and an antenna 47 connected to that signal line 45 and positioned outside the air valve 30. Note that, in FIG. 2, a hole of the rim wheel 2 is closed by a plug 60.

This signal line 45 is formed by a core wire 45a made of a conductor and a coaxial cable 45b covering that core wire 45a More specifically, the coaxial cable 45b is such that the core wire 45a is wrapped by an insulator or a shock absorber such as polyethylene, an outer side (circumference) of the insulator or the shock absorber is covered by a net shaped shield layer made of knitted copper wires, and further an outer side of the shield layer is covered by a vinyl chloride or the like.

Also, towards a pouring opening 31 of the air valve 30 and at a position on an outer side of the partitioned space 10, the antenna 47 is extending substantially in parallel to a straight line portion 32 having a straight line shape of the air valve 30.

Also, at a connecting portion of the signal line 45 and the antenna 47, a tuning circuit 49 in which a capacitor and a coil are connected in series is provided, in order to prevent the attenuation of radio waves transmitted from the transmitter substrate 43 (to transmit high precision radio waves).

According to the tyre 1 of the first embodiment described above, the antenna 47 is positioned outside the air valve 30, so that the electronic device 40 can transmit the high precision radio waves which will not be reflected in the partitioned space 10.

More specifically, the electronic device 40 has the signal line 45 formed by the core wire 45a made of a conductor and the coaxial cable 45b covering that core wire 45a, so that the reflection of the radio waves between the signal lines 45, that is the reflection of the radio waves in the partitioned space 10 and inside the air valve 30, can be prevented (the radio waves will not be attenuated).

Also, the antenna 47 is positioned outside the air valve 30, so that the electronic device 40 can transmit the high precision radio waves which will not be reflected in that partitioned space 10 and inside the air valve 30.

In addition, the tuning circuit 49 is provided at a connecting portion of the signal line 45 and the antenna 47, so that the attenuation of the radio waves transmitted from the transmitter substrate 43 can be prevented (the high precision radio waves can be transmitted).

Also, in the first embodiment, the antenna 47 is placed outside the partitioned space 10 (namely, outside of the tyre 1) by using the coaxial cable 45b inside the plug 60, so that the LC resonance (L: coil, C: capacitor) is avoided.

Second Embodiment

Next, the electronic device 40 according to the second embodiment will be described with reference to FIG. 3. Note that the configuration other than the electronic device 40 is similar to that of the first embodiment described above so that the detailed description will be omitted.

The electronic device 40 described above is transmitting information of the tyre to the wheel side through the signal line 45 positioned inside the air valve 30 and the antenna 47 positioned outside the air valve 30, but it is not limited to this.

Here, the signal line 45 and the antenna 47 to be described below are arranged in a region other than the air valve 30 provided on the rim wheel 2.

Figure 3:
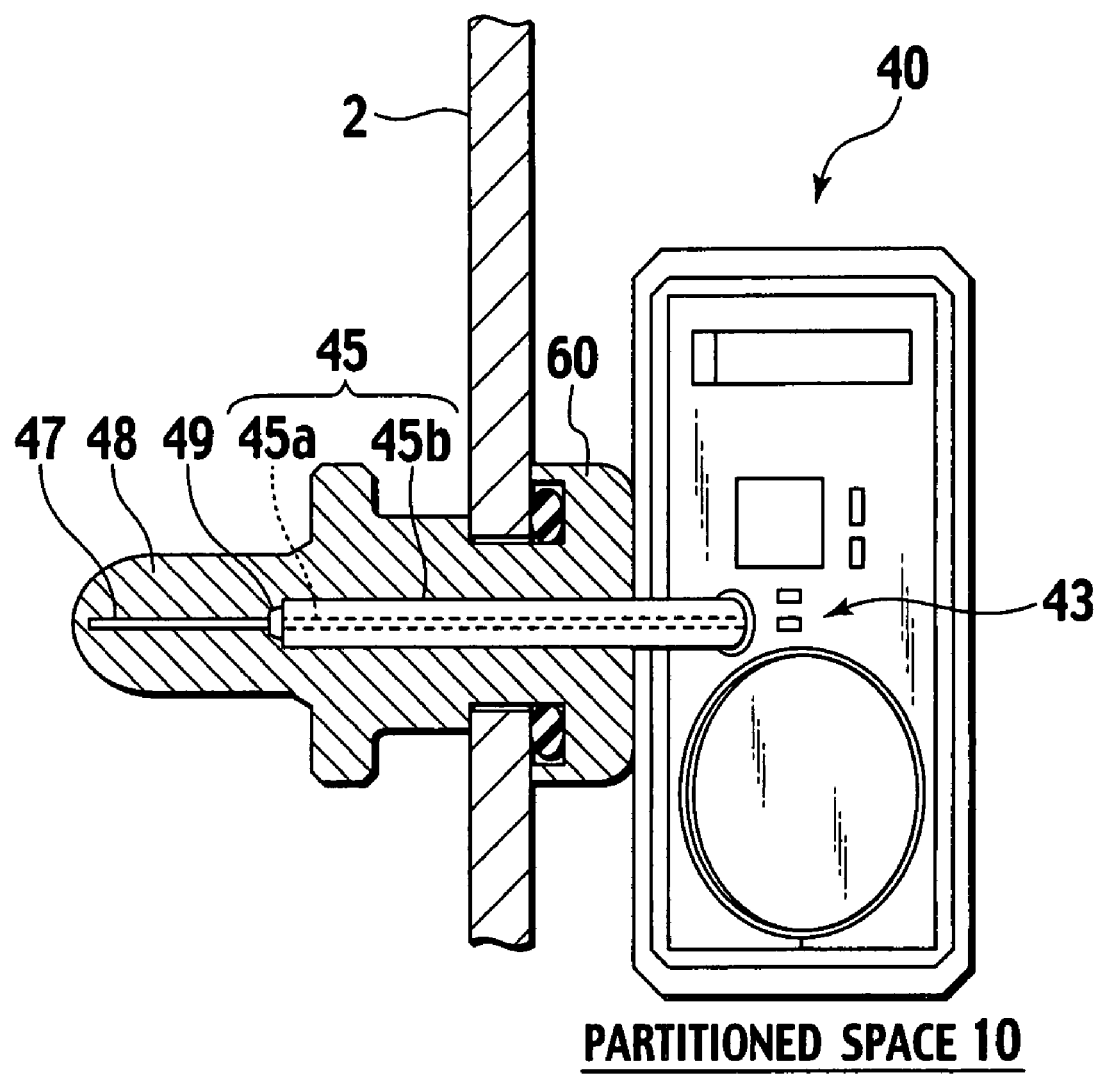
FIG. 3 is an enlarged cross sectional view of an electronic device according to the second embodiment of the present invention.

More specifically, as shown in FIG. 3, the signal line 45 is extended from the transmitter substrate 43 through the rim wheel 2 to outside of the partitioned space 10 (namely, outside of the tyre 1). This signal line 45 is formed by the core wire 45a made of a conductor and the coaxial cable 45b covering that core wire 45a.

The antenna 47 is positioned outside the partitioned space 10 and connected to the core wire 45a. Also, it is preferable to arrange an antenna guard 48 for directly covering the antenna 47 (namely, covering the antenna 47 by making contact with the antenna 47). For this antenna guard 48, plastics (polyethylene, polyvinyl chloride, polystyrene, polypropylene, for example) are used.

Also, in the second embodiment, similarly as in the first embodiment, at a connecting portion of the signal line 45 and the antenna 47, the tuning circuit 49 in which a capacitor and a coil are connected in series is provided, in order to prevent the attenuation of radio waves transmitted from the transmitter substrate 43 (to transmit high precision radio waves).

According to the tyre 1 of the second embodiment, the antenna 47 is positioned outside the tyre 1 (outside of the partitioned space 10), so that the electronic device 40 can transmit the high precision radio waves which will not be reflected in the partitioned space 10.

More specifically, the electronic device 40 has the signal line 45 formed by the core wire 45a made of a conductor and the coaxial cable 45b covering that core wire 45a, so that the reflection of the radio waves between the signal lines 45, that is the reflection of the radio waves in the partitioned space 10 and inside the air valve 30, can be prevented (the radio waves will not be attenuated).

Also, the antenna 47 is positioned outside the partitioned space 10, so that the electronic device 40 can transmit the high precision radio waves which will not be reflected in that partitioned space 10 and inside the air valve 30.

Also, the tuning circuit 49 is provided at a connecting portion of the signal line 45 and the antenna 47, so that the attenuation of the radio waves transmitted from the transmitter substrate 43 can be prevented (the high precision radio waves can be transmitted).

In addition, the antenna guard 48 for directly covering the antenna 47 is provided, so that the antenna can be reinforced and that antenna can be protected.

Also, in the second embodiment, similarly as in the first embodiment, the antenna 47 is placed outside the partitioned space 10 (namely, outside of the tyre 1) by using the coaxial cable 45b inside the plug 60, so that the LC resonance is avoided.

As such, according to the first embodiment and the second embodiment, the radio waves emitted out of the partitioned space 10 have the size equivalent to that of the radio waves transmitted by the transmitter substrate 43. Namely, matching the impedance by using the coaxial cable 45b which is shielded so as not to receive the influence of the high frequency can carry out the efficient communications. Consequently, it is possible to provide the electronic device 40 that can transmit the high precision radio waves which will not be reflected in the partitioned space 10, and the tyre 1 on which that electronic device 40 is provided.

Other Embodiments

As described above, the contents of the present invention are disclosed through the first embodiment and second embodiment of the present invention, but the description and the drawings that constitute a part of this disclosure are not limiting the present invention.

More specifically, it has been described that the tuning circuit 49 in which a capacitor and a coil are connected in series is provided at a connection portion of the signal line 45 and the antenna 47, but it is not limited to this, and it suffices to be anything that prevents the attenuation of the radio waves transmitted from the transmitter substrate 43 (that transmits the high precision radio waves).

From this disclosure, various alternative embodiments, implementations and operating techniques will become apparent to those skilled in the art. Consequently, the technical range of the present invention can be determined only by the invention specifying factors according to the scope of the patent claims appropriate from the explanation described above.

The entire contents of the Japanese Patent Application No. 2005-071460 (filing date: Mar. 14, 2005) are herein incorporated.

INDUSTRIAL APPLICABILITY

According to the present invention, it is possible to provide the electronic device that can transmit the high precision radio waves which will not be reflected in the partitioned space, and the tyre on which that electronic device is provided.

The invention claimed is:

1. An electronic device, comprising:
    a generation unit for generating information to be measured by a sensor arranged in a partitioned space which is partitioned by a tyre and a rim wheel,
    a signal line extended from the generation unit to outside of the partitioned space and passing through an inner side of an air valve provided at the rim wheel, the signal line being formed by a core wire made of a conductor and a coaxial cable covering the core wire, and
    an antenna for transmitting radio waves containing the information generated by the generation unit, the antenna being connected to the signal line and positioned outside the air valve.

2. An electronic device, comprising:
    a generation unit for generating information to be measured by a sensor arranged in a partitioned space which is partitioned by a tyre and a rim wheel,
    a signal line extended from the generation unit through the rim wheel to outside of the partitioned space, the signal line being formed by a core wire made of a conductor and a coaxial cable covering the core wire, and
    an antenna for transmitting radio waves containing the information generated by the generation unit, the antenna being connected to the core wire and positioned outside the partitioned space.

3. The electronic device as described in claim 2, wherein the electronic device comprises an antenna guard covering the antenna.

4. A tyre on which at least an electronic device capable of transmitting information by radio is provided, the electronic device comprising:
    a generation unit for generating information to be measured by a sensor arranged in a partitioned space which is partitioned by the tyre and a rim wheel,
    a signal line extended from the generation unit to outside of the partitioned space and passing through an inner side of an air valve provided at the rim wheel, the signal line being formed by a core wire made of a conductor and a coaxial cable covering the core wire, and
    an antenna for transmitting radio waves containing the information generated by the generation unit, the antenna being connected to the signal line and positioned outside the air valve.

5. A tyre on which at least an electronic device capable of transmitting information by radio is provided, the electronic device comprising:
    a generation unit for generating information to be measured by a sensor arranged in a partitioned space which is partitioned by the tyre and a rim wheel,
    a signal line extended from the generation unit through the rim wheel to outside of the partitioned space, the signal line being formed by a core wire made of a conductor and a coaxial cable covering the core wire, and
    an antenna for transmitting radio waves containing the information generated by the generation unit, the antenna being connected to the core wire and positioned outside the partitioned space.

6. The tyre as described in claim 5, wherein the type comprises an antenna guard covering the antenna.

* * * * *